US010628492B2

(12) United States Patent
Ma et al.

(10) Patent No.: US 10,628,492 B2
(45) Date of Patent: Apr. 21, 2020

(54) DISTRIBUTED GRAPH DATABASE WRITES

(71) Applicant: LinkedIn Corporation, Sunnyvale, CA (US)

(72) Inventors: Xiaobin Ma, Fremont, CA (US); Scott M. Meyer, Berkeley, CA (US); Andrew Rodriguez, Palo Alto, CA (US); Walaa Eldin M. Moustafa, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 15/655,303

(22) Filed: Jul. 20, 2017

(65) Prior Publication Data

US 2019/0026334 A1    Jan. 24, 2019

(51) Int. Cl.
*G06F 16/00* (2019.01)
*G06F 16/901* (2019.01)
*G06F 17/10* (2006.01)

(52) U.S. Cl.
CPC ...... *G06F 16/9024* (2019.01); *G06F 16/9027* (2019.01); *G06F 17/10* (2013.01)

(58) Field of Classification Search
CPC .. G06F 16/9024; G06F 16/9027; G06F 16/21; G06F 16/28
See application file for complete search history.

(56) References Cited

U.S. PATENT DOCUMENTS

| 7,376,639 | B2 | 5/2008 | Kutsch et al. |
| 8,185,558 | B1 | 5/2012 | Narayanan |
| 8,533,182 | B1 | 9/2013 | Charboneau |
| 8,736,612 | B1 | 5/2014 | Goldman |
| 9,189,520 | B2 | 11/2015 | May et al. |
| 9,292,570 | B2 | 3/2016 | Sargeant et al. |
| 9,330,138 | B1 | 5/2016 | Shankar et al. |

(Continued)

FOREIGN PATENT DOCUMENTS

| EP | 2937797 A1 | 10/2015 |
| WO | 2012091844 A1 | 7/2012 |
| WO | 2017048303 A1 | 3/2017 |

OTHER PUBLICATIONS

Huanai He, Graphs-at-a-time: Query Language and Access Methods for Graph Databases, Jun. 9 2008, Sigmod '08, p. 405-417.*

(Continued)

*Primary Examiner* — Thu Nguyet T Le
(74) *Attorney, Agent, or Firm* — Park, Vaughan, Fleming & Dowler LLP; Chia-Hsin Suen

(57) ABSTRACT

The disclosed embodiments provide a system for processing queries of a graph database. During operation, the system executes a set of processes for maintaining the graph database storing a graph, wherein the graph includes a set of nodes, a set of edges between pairs of nodes in the set of nodes, and a set of predicates. When a write query of the graph database is received, the system uses one or more of the processes to process the write query by using a schema of the graph database to validate the write query. Next, the system transmits the validated write query to a set of shards containing the graph database. Finally, the system processes the write query at each shard when a shard identifier representing the shard is matched to one or more attributes in the write query.

20 Claims, 6 Drawing Sheets

(56) References Cited

U.S. PATENT DOCUMENTS

| | | |
|---|---|---|
| 9,372,891 B2 | 6/2016 | Eliaš |
| 9,378,241 B1 | 6/2016 | Shankar |
| 9,378,303 B1 | 6/2016 | Shankar |
| 9,495,427 B2 | 11/2016 | Abadi et al. |
| 9,527,497 B2 | 12/2016 | Morita et al. |
| 2003/0084043 A1 | 5/2003 | Acharya |
| 2006/0036564 A1 | 2/2006 | Yan et al. |
| 2007/0192306 A1 | 8/2007 | Papakonstantinou |
| 2007/0239694 A1 | 10/2007 | Singh |
| 2008/0116449 A1 | 5/2008 | Macready |
| 2008/0306910 A1 | 12/2008 | Singh |
| 2009/0132503 A1 | 5/2009 | Sun |
| 2009/0240649 A1 | 9/2009 | Sereni |
| 2009/0240682 A1 | 9/2009 | Balmin |
| 2011/0270861 A1 | 11/2011 | Arshavsky |
| 2011/0276781 A1 | 11/2011 | Sengupta et al. |
| 2011/0307524 A1 | 12/2011 | Aitken et al. |
| 2012/0005224 A1 | 1/2012 | Ahrens |
| 2012/0047114 A1 | 2/2012 | Duan |
| 2012/0054129 A1 | 3/2012 | Aggarwal |
| 2012/0096043 A1 | 4/2012 | Stevens, Jr. |
| 2012/0136884 A1 | 5/2012 | Kanawa |
| 2012/0179644 A1 | 7/2012 | Miranker |
| 2012/0284255 A1 | 11/2012 | Schechter |
| 2013/0091122 A1 | 4/2013 | Salch et al. |
| 2013/0097180 A1 | 4/2013 | Tseng |
| 2014/0156632 A1 | 6/2014 | Yu et al. |
| 2014/0172914 A1 | 6/2014 | Elinkety et al. |
| 2014/0195564 A1 | 7/2014 | Talagala et al. |
| 2014/0201234 A1 | 7/2014 | Lee et al. |
| 2014/0280044 A1 | 9/2014 | Huynh et al. |
| 2014/0310302 A1 | 10/2014 | Wu |
| 2014/0330867 A1 | 11/2014 | Sarkar |
| 2014/0337373 A1 | 11/2014 | Morsi |
| 2015/0012523 A1 | 1/2015 | Dey et al. |
| 2015/0026158 A1 | 1/2015 | Jin |
| 2015/0052134 A1 | 2/2015 | Bornea et al. |
| 2015/0120717 A1 | 4/2015 | Kim |
| 2015/0120775 A1 | 4/2015 | Shao |
| 2015/0127677 A1 | 5/2015 | Wang |
| 2015/0134637 A1 | 5/2015 | Pall |
| 2015/0149435 A1 | 5/2015 | Mckenna et al. |
| 2015/0169686 A1 | 6/2015 | Elias et al. |
| 2015/0234888 A1 | 8/2015 | Ahmed et al. |
| 2015/0302300 A1 | 10/2015 | Fletcher |
| 2016/0071233 A1 | 3/2016 | Macko et al. |
| 2016/0171540 A1 | 6/2016 | Mangipudi |
| 2016/0188594 A1 | 6/2016 | Ranganathan |
| 2016/0246842 A1 | 8/2016 | Li et al. |
| 2016/0260011 A1 | 9/2016 | Corvinelli et al. |
| 2016/0275177 A1 | 9/2016 | Yin et al. |
| 2016/0314220 A1 | 10/2016 | Sachdev et al. |
| 2017/0010968 A1 | 1/2017 | Li et al. |
| 2017/0054716 A1 | 2/2017 | Egorov et al. |
| 2017/0083571 A1 | 3/2017 | Shankar |
| 2017/0212945 A1 | 7/2017 | Shankar et al. |
| 2018/0039710 A1* | 2/2018 | Chen ................ G06F 16/24568 |
| 2018/0144061 A1 | 5/2018 | Rodriguez et al. |
| 2018/0357329 A1 | 12/2018 | Meyer et al. |

OTHER PUBLICATIONS

Zou et al.; "Summarization Graph Indexing: Beyond Frequent Structure-Based Approach", DASFAA 2008, LNCS 4947, pp. 141-155 XP019087336, Mar. 2008.

Williams et al.; "Graph Database Indexing Using Structured Graph Decomposition", 2007 IEEE, pp. 976-985, XP031095841, Apr. 2007.

Prabhakaran et al.; "Managing Large Graphs on Multi-Cores with Graph Awareness", USENIX, pp. 1-12, XP061013942, Apr. 11, 2013.

Ousterhout et al.; "The RAMCloud Storage System", ACM Transactions on Computer Systems, vol. 33, No. 3, Article 7, published Aug. 31, 2015.

Shao et al.; "Trinity: A Distributed Graph Engine on a Memory Cloud", Proceedings of the 2013 International Conference on Management of Data, SIGMOD, Jun. 22, 2013, XP055396688.

International Search Report and Written Opinion from PCT International Application No. PCT/US2016/068119, dated Aug. 9, 2017, Authorized Officer Sommermeyer, Katrin EPO.

Koszewnik, "The Netflix Tech Blog: NefflixGraph Metadata Library: An Optimization Case Study", Jan. 18, 2013, XP055362100, retrieved from the Internet: URL: http://techblog.netflix.com/2013/01/netflixgraph-metadata-library_18.html.

Blandford et al.; "An Experimental Analysis of a Compact Graph Representation", Workshop on Algorithms Engineering and Experiments (ALENEX), Jan. 1, 2004, XP055177526.

Stepanov et al.; "SIMD-Based Decoding of Posting Lists", Proceedings of the 20th ACM Conference on information and knowledge Management, XP002759898, retrieved from the Internet URL: http://www.stepanovpapers.com/CIKM_2011.pdf, Oct. 24-28, 2011.

Lemire et al.; "Decoding Billions of integers per second through vectorization", software Practice & Experience, vol. 15, No. 1, Jan. 1, 2015, XP055363887, pp. 1-29.

Dean; Challenges in building large-scale information retrieval systems, Keynote of the 2nd ACM International Conference on Web Search and Data Mining (WSDM). 2009 http://videolectures.net/wsdm09_dean_cblirs/.

Wikipedia; "Delta Encoding", The Free Encyclopedia. Accessed at https://en.wikipedia.org/wiki/Delta_encoding Apr. 10, 2017.

"Non Final Office Action Issued in U.S. Appl. No. 15/003,527", dated Feb. 7, 2018, 07 Pages.

"Non Final Office Action Issued in U.S. Appl. No. 15/003,527", dated Jun. 21, 2018, 10 Pages.

"Non Final Office Action Issued in U.S. Appl. No. 15/360,605", dated Oct. 17, 2018, 19 Pages.

"International Search Report and Written Opinion Issued in PCT Application No. PCT/US17/67953", dated Feb. 26, 2018, 09 Pages.

Makris et al.; "A classification of NoSQL data stores based on key design characteristics", Procedia Computer Science, vol. 97, 2016, retrieved from Internet https://www.sciencedirect.com/science/article/pii/S1877050916321007 (retrieved Feb. 6, 2018).

"Non Final Office Action Issued in U.S. Appl. No. 15/618,238" dated Oct. 29, 2019, 16 Pages.

* cited by examiner

DISTRIBUTED GRAPH DATABASE WRITES

RELATED APPLICATIONS

The subject matter of this application is related to the subject matter in a co-pending non-provisional application by inventors Andrew Rodriguez, Andrew J. Carter, Scott M. Meyer and Srinath Shankar, entitled "Edge Store Designs for Graph Databases," having Ser. No. 15/360,605, and filing date 23 Nov. 2016.

The subject matter of this application is also related to the subject matter in a co-pending non-provisional application by inventors Shyam Shankar and Scott M. Meyer, entitled "Branchable Graph Databases," having Ser. No. 15/003,527 and filing date 21 Jan. 2016.

The subject matter of this application is also related to the subject matter in a co-pending non-provisional application by inventors Scott M. Meyer, Andrew J. Carter, Andrew Rodriguez and Walaa Eldin M. Moustafa, entitled "Supporting Tuples in Log-Based Representations of Graph Databases," having Ser. No. 15/618,238, and filing date 9 Jun. 2017.

BACKGROUND

Field

The disclosed embodiments relate to graph databases. More specifically, the disclosed embodiments relate to techniques for performing distributed graph database writes.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
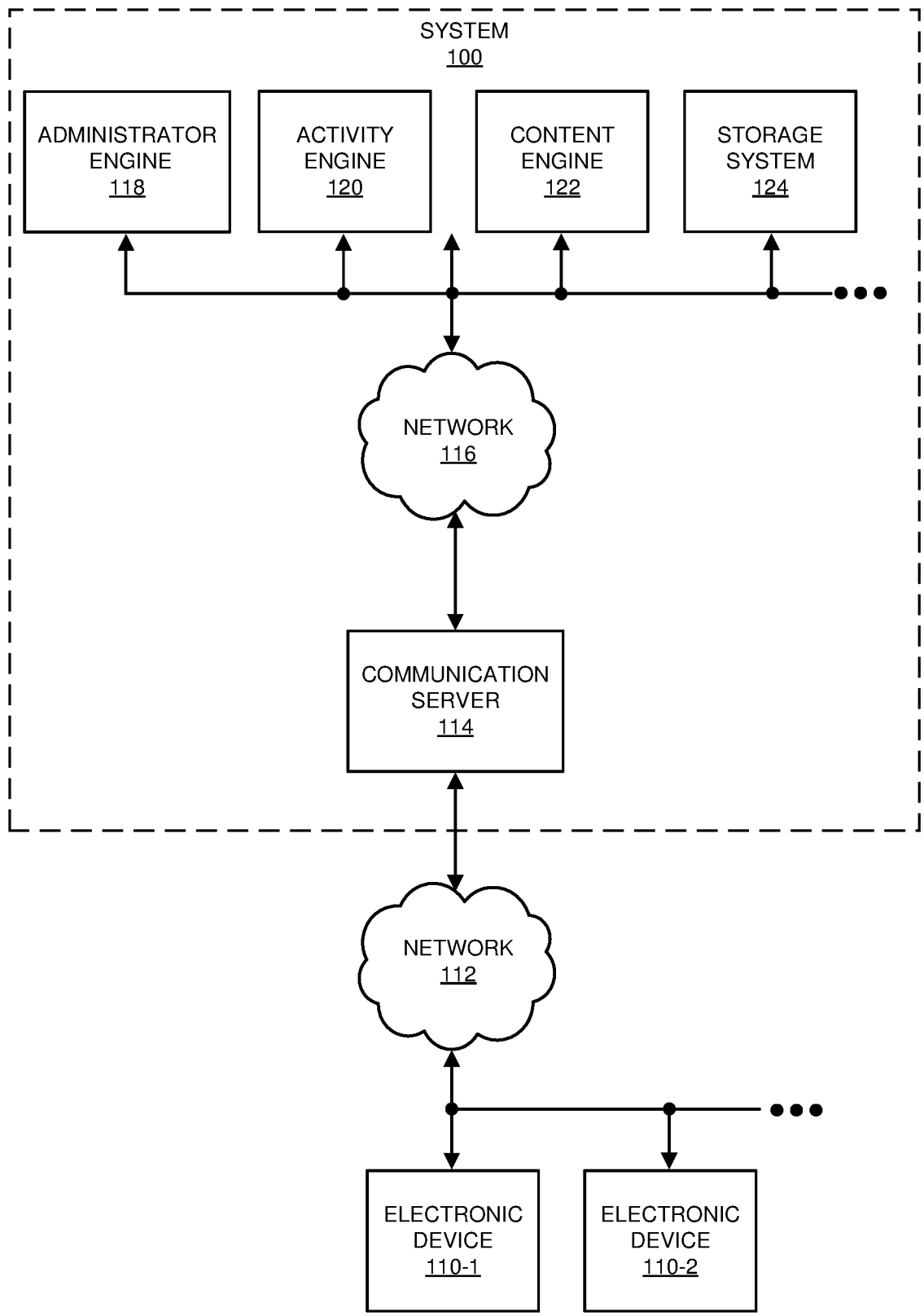
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
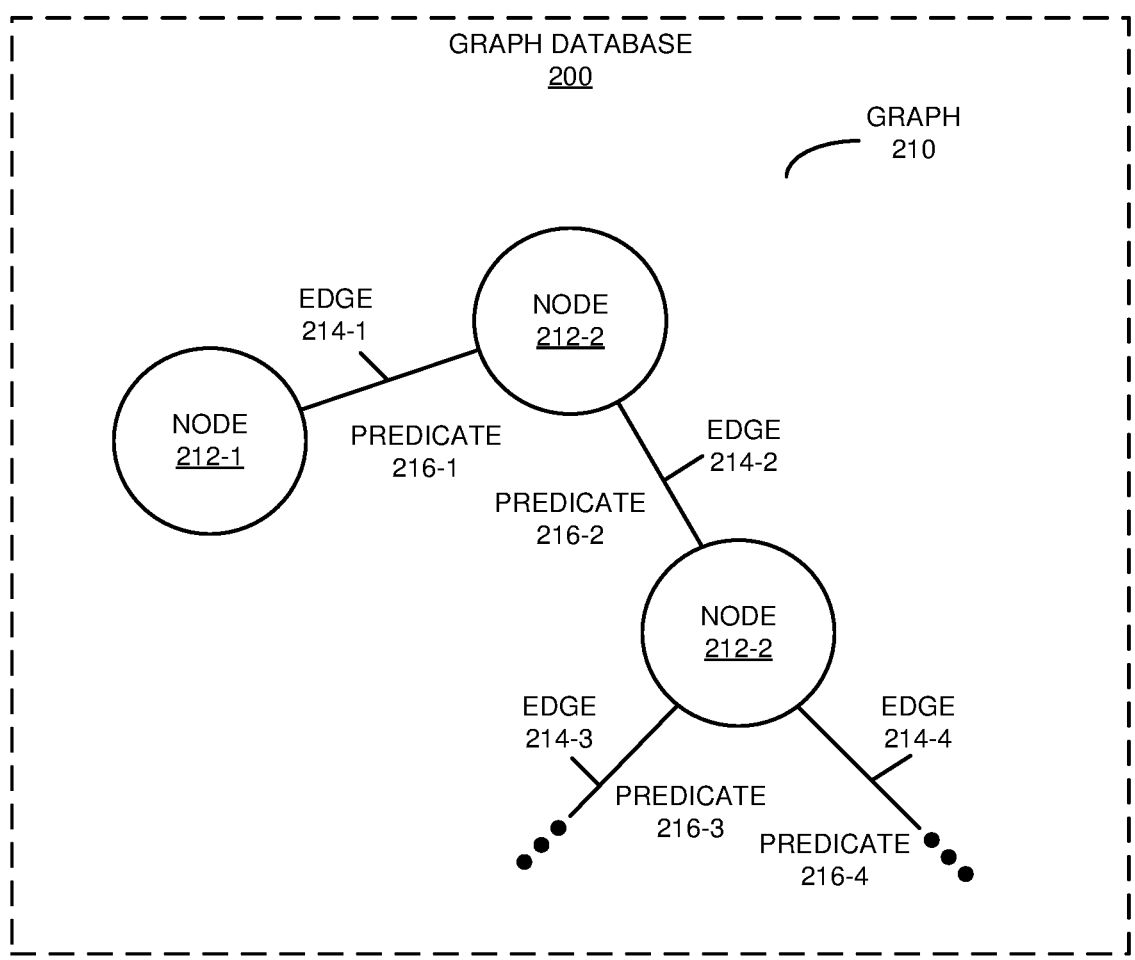
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Each edge in graph 210 may be specified in a (subject, predicate, object) triple. For example, an edge denoting a connection between two members named "Alice" and "Bob" may be specified using the following statement:

Edge("Alice", "ConnectedTo", "Bob").

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")?

A subsequent statement may modify the initial statement with a tilde to indicate deletion of the edge from graph database 200:

Edge~("Alice", "ConnectedTo", "Bob").

In addition, specific types of edges and/or more complex structures in graph 210 may be defined using schemas. Continuing with the previous example, a schema for employment of a member at a position within a company may be defined using the following:

```
DefPred("employ/company", "1", "node", "0", "node").
DefPred("employ/member", "1", "node", "0", "node").
DefPred("employ/start", "1", "node", "0", "date").
DefPred("employ/end_date", "1", "node", "0", "date").
M2C(e, memberId, companyId, start, end) :-
    Edge(e, "employ/member", memberId),
    Edge(e, "employ/company", companyId),
    Edge(e, "employ/start", start),
    Edge(e, "employ/end_date", end)
```

In the above schema, a compound for the employment has a compound type of "M2C." The compound is also represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

Consequently, compounds in queries of graph database 200 or otherwise stored in graph database 200 may model complex relationships (e.g., employment of a member at a position within a company) using a set of basic types (i.e., nodes 212, edges 214, predicates 216) in graph database 200. More specifically, each compound may represent an n-ary relationship in the graph, with each "component" of the relationship identified using the predicate and object (or subject) of an edge. A set of "n" edges that model the relationship may then be linked to the compound using a common subject (or object) that is set to a hub node representing the compound. In turn, new compounds may dynamically be added to graph database 200 without changing the basic types used in graph database 200 by specifying relationships that relate the compound structures to the basic types in schemas for the compounds.

Graph 210 and the associated schemas may additionally be used to populate graph database 200 for processing of queries against the graph. More specifically, a representation of nodes 212, edges 214, and predicates 216 may be obtained from a source of truth, such as a relational database, distributed filesystem, and/or other storage mechanism, and stored in a log in the graph database. Lock-free access to the graph database may be implemented by appending changes to graph 210 to the end of the log instead of requiring modification of existing records in the source of truth. In turn, the graph database may provide an in-memory cache of the log and an index for efficient and/or flexible querying of the graph.

In other words, nodes 212, edges 214, and predicates 216 may be stored as offsets in a log that is read into memory in graph database 200. For example, the exemplary edge statement for creating a connection between two members named "Alice" and "Bob" may be stored in a binary log using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in the log, offsets in the log may be used as identifiers for the changes. Continuing with the previous example, the offset of 275 may be used as a unique identifier for the edge representing the connection between "Alice" and "Bob." The offsets may additionally be used as representations of virtual time in the graph. More specifically, each offset in the log may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

As an alternative to edge-based representations in graph database 200, compounds may be formatted and/or stored as tuples in graph database 200. Each tuple may include a header with information related to the tuple, including a length of the tuple, a write operation (e.g., addition, deletion, or non-assertion) associated with the compound, and/or a set of cardinalities associated with predicates in the compound. The header may be followed by the compound type of the corresponding compound and a set of identity-giving nodes, with each identity-giving node containing a predicate-object pair that represents a corresponding attribute used to define the compound. The tuple may optionally store one or more non-identity-giving attributes associated with the n-ary relationship modeled in the compound. For example, the "M2C" compound described above may be supplemented by an optional attribute representing the job title associated with the member's employment at the company.

Consequently, the tuple may be a compact representation of the compound that is efficiently referenced and stored within a single entry of the log. Moreover, the tuple may be functionally equivalent to an edge set containing a hub node that identifies the tuple and predicate-object pairs from the tuple. Storing compounds in log-based representations of graph databases is described in a co-pending non-provisional application by inventors Scott Meyer, Andrew Carter, Andrew Rodriguez and Walaa Moustafa, entitled "Supporting Tuples in Log-Based Representations of Graph Databases," having Ser. No. 15/618,238, and filing date 9 Jun. 2017, which is incorporated herein by reference.

Note that graph database 200 may be an implementation of a relational model with constant-time navigation, i.e., independent of the size N, as opposed to varying as log(N). Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in U.S. Pat. No. 9,535,963 (issued 3 Jan. 2017), by inventors Srinath Shankar, Rob Stephenson, Andrew Carter, Maverick Lee and Scott Meyer, entitled "Graph-Based Queries," which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. For example, graph database 200 may be configured to store data associated with a variety of flexible schemas using edges representing subjects, objects, and predicates in the graph. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

The graph database may also include an in-memory index structure that enables efficient lookup of edges 214 of graph 210 by subject, predicate, object, and/or other keys or parameters. The index structure may include a hash map and an edge store. Entries in the hash map may be accessed using keys such as subjects, predicates, and/or objects that partially define edges in the graph. In turn, the entries may include offsets into the edge store that are used to resolve and/or retrieve the corresponding edges. Edge store designs for graph database indexes are described in a co-pending non-provisional application by inventors Andrew Rodriguez, Andrew Carter, Scott Meyer and Srinath Shankar, entitled "Edge Store Designs for Graph Databases," having Ser. No. 15/360,605, and filing date 23 Nov. 2016, which is incorporated herein by reference.

Figure 3:
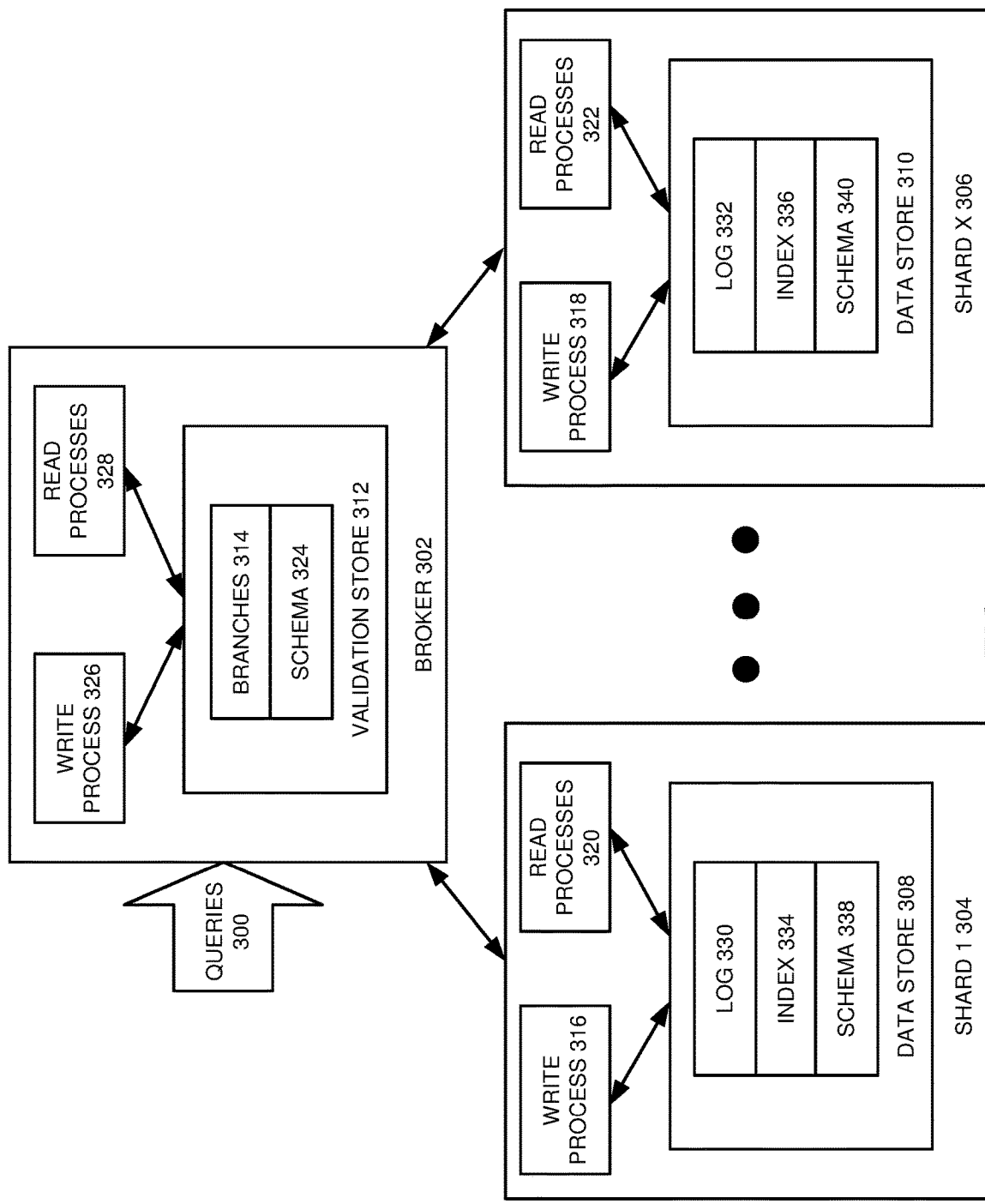
FIG. 3 shows a system for processing queries of a graph database in accordance with the disclosed embodiments.

As shown in FIG. 3, graph database 200 may also be distributed and/or partitioned across multiple shards (e.g., shard 1 304, shard x 306). For example, the graph database may be stored in a number of physical and/or virtual machines representing the shards in one or more clusters. Shards may be added to an existing cluster to reduce the memory footprint of each shard, and new clusters may be added to scale with the volume of graph database queries 300. Because each cluster contains a complete copy of the graph database, graph database queries 300 may be processed by a given cluster independently of the addition, removal, maintenance, downtime, and/or uptime of the other clusters and/or storage nodes in the other clusters.

Each shard may include a data store (e.g., data stores 308-310) that provides a log (e.g., logs 330-332) and index (e.g., indexes 334-336) for the graph database. As discussed above, the log and index may be used to access a subset of nodes, predicates, edges, and/or compounds in the graph database. Each shard may further store a separate copy of a schema (e.g., schemas 338-340) for the graph database. For example, the schema may include a set of rules that define predicates, compounds and/or other types of relationships or structures in the graph database.

Queries 300 of the graph database may be received by one or more instances of a broker 302. As with the shards, instances of broker 302 may execute to scale with the volume of graph database queries and/or provide specialized services related to the processing of the queries. For example, one or more instances of broker 302 may provide an application-programming interface (API) that allows applications, services, and/or other components to retrieve social network data stored in the graph database.

Each broker 302 instance may execute a set of processes for processing queries 300 of the graph database. The processes may include a single write process 326 and multiple read processes 328, which are launched and managed by a management process (not shown) in broker 302. Write process 326 may process write queries of the graph database, and read processes 328 may process read queries of the graph database.

After a write query is received, write process 326 may use a validation store 312 in broker 302 to validate the write query. More specifically, write process 326 may use a schema 324 for the graph database from validation store 312 to write nodes, edges, compounds, and/or other data in the write query to a branch (e.g., branches 314) of the graph database. If the write query successfully executes within the branch based on schema 324, the write query is validated. Using branches of graph databases to validate write queries is described in a co-pending non-provisional application by inventors Shyam Shankar and Scott Meyer, entitled "Branchable Graph Databases," having Ser. No. 15/003,527 and filing date 21 Jan. 2016, which is incorporated herein by reference.

After the write query is validated, write process 326 may forward the write query to all shards of the graph database and delete the branch. If the write query fails validation using schema 324 and one or more branches 314 of the graph database, write process 326 may retrieve, from one or more shards, the latest version of the graph database schema (e.g., schemas 338-340) and revalidate the write query using the latest version and a different branch of the graph database. Write process 326 and/or another component of broker 302 may also replace schema 324 in validation store 312 with the latest version for use in validating subsequent write queries. Thus, broker 302 may use a "lazy" schema write strategy that updates the local copy of schema 324 with the latest version only after a write query fails validation using the existing local copy.

If the write query still fails validation using the latest version of the graph database schema, write process 326 may omit forwarding of the write query to shards storing the graph database. Write process 326 may also respond to the write query with a write error containing one or more reasons for the failed validation.

After a validated write query is forwarded from broker 302 to all shards, each shard may individually determine if one or more portions of the write query are to be executed on that shard. As with broker 302, each shard instance includes a single write process (e.g., write processes 316-318) and multiple read processes (e.g., read processes 320-322) that are governed by a management process (not shown). The write processes may execute write queries of the graph database, and the read processes may execute read queries of the graph database.

To ensure that all shards contain the latest version of the graph database schema, every shard may update its local copy of the schema with schema updates in write queries from broker 302. As a result, broker 302 may request the latest version from any of the shards (e.g., after a subsequent write query fails validation using schema 324).

In one or more embodiments, the system of FIG. 3 uses a horizontal hash-based partitioning strategy to divide data in the graph database into the shards. In the horizontal hash-based partitioning strategy, a pseudo-random hash function may be used to calculate a hash from one or more keys used in querying of the graph database. The hash may be used to identify a shard in the graph database, and all data associated with the key may be stored in the shard.

To process a write query containing an edge, each shard may calculate a hash from the subject and object in the edge. If either hash value matches a shard identifier representing the shard, the entire edge is written to the log and index in the data store (e.g., data stores 308-310) on the shard. For example, the edge may be written to a log-based representation of the graph database (e.g., logs 330-332) in the data store, and one or more portions of the edge may be written to an index (e.g., indexes 334-336) that enables efficient lookup of edges by the corresponding subject and/or object. As a result, the system may provide a "one-hop guarantee," in which for every node in the graph database, there exists a single shard containing all edges that refer to the node as either a subject or object. Processing of distributed write queries in graph databases is described in further detail below with respect to FIG. 4.

In other words, an edge in the graph database with may be written to one or two shards, depending on the hashes calculated from the edge's subject and object. If both the subject and object of the edge are anonymous, the edge may be written to a random shard based on a universally unique identifier (UUID) and/or other attribute of the write query containing the edge. In turn, a subsequent read query associated with the edge may be transmitted to all shards to enable resolution of the read query.

To process a write query containing a compound, each shard may calculate a hash from all identity-giving nodes in the compound. If any of the hash values match the shard identifier for the shard, the entire compound is written to the data store on the shard. For example, the compound, including all identity-giving nodes and non-identity-giving attributes, may be written to a log-based representation of the graph database and/or one or more indexes that enable efficient lookup of compounds by the corresponding identity-giving nodes in all shards identified by hash values calculated from the identity-giving nodes. The non-identity-giving attributes may be included in tuple-based representations of the compounds or written separately as edges that reference the hub nodes of the corresponding compounds. Edges representing non-identity-giving attributes of the compounds may alternatively or additionally be written to additional shards identified by hash values calculated from the subjects and/or objects of the edges. As with processing of edge-based queries, the system may provide a "one-hop guarantee" for compounds that allows all tuples and/or edges containing a given identity-giving node to be stored on the same shard. If the compound lacks any identity-giving nodes, the hash and/or shard identifier may be calculated from the hub node of the compound.

The shards may further include functionality to process write queries containing implicit deletes. For example, a write query may contain an edge with a predicate that has a cardinality of one for a given subject, such as a predicate representing marriage or marital status. Thus, a write of a new edge that includes the predicate (e.g., marriage of Alice and Chris) may implicitly delete an existing edge with the same subject (or object) and predicate (e.g., marriage of Alice and Bob). On the other hand, the new edge may be written to a different set of shards than the existing edge, which may result in inaccuracies or inconsistencies in the graph database when the write of the new edge is not correctly processed at all shards storing the existing edge.

To ensure accurate processing of cardinality-1 predicates in the graph database, each shard may match the subject (or object) of a new edge in a write query with a cardinality-1 predicate to an existing edge in the graph database. If an existing edge is found, the shard may calculate an additional hash from the object (or subject) of the existing edge. If the additional hash matches the identifier of the shard, the shard may delete the existing edge from its local data store. Continuing with the previous example, the existing edge of "Alice" and "Bob" may be written to shards with identifiers of 1 and 2 in the graph database. The new edge of "Alice" and "Chris" may produce hashes that map to shard identifiers of 1 and 3 in the graph database. As a result, the shard with the identifier of 1 may write the new edge to the graph database and delete the existing edge from the graph database. The shard with the identifier of 3 may write the new edge to the graph database without deleting the existing edge (since the existing edge does not exist on the shard). The shard with the identifier of 2 may match the subject (or object) and predicate of the new edge to the existing edge and delete the existing edge without writing the new edge to the graph database (because neither hash generated from the new edge matches the shard identifier of 2).

By distributing all write queries from a centralized broker across a set of shards and determining whether to execute the write queries at individual shards, the system of FIG. 3 may reduce or omit the need for a central point of control in the graph database. In turn, new shards and/or broker instances may be independently added to the graph database to scale with the volume of graph database queries instead of requiring a complete rebuild of the graph database to accommodate different numbers of shards and/or broker instances.

Those skilled in the art will appreciate that the system of FIG. 3 may be implemented in a variety of ways. As mentioned above, multiple instances of broker 302 and/or each shard may be used to process various types of queries from other components or services. Along the same lines, broker 302 and the shards may be provided by a single physical machine, multiple computer systems, one or more virtual machines, a grid, a number of clusters, one or more databases, one or more filesystems, and/or a cloud computing system. Read processes, write processes, data stores, validation stores, and/or other sub-components of the system may additionally be implemented together and/or separately by one or more software components and/or layers.

Those skilled in the art will also appreciate that the system of FIG. 3 may be adapted to other types of functionality. For example, the validation and distribution of write operations using a broker and multiple shards may be used with other types of data and/or data stores.

Figure 4:
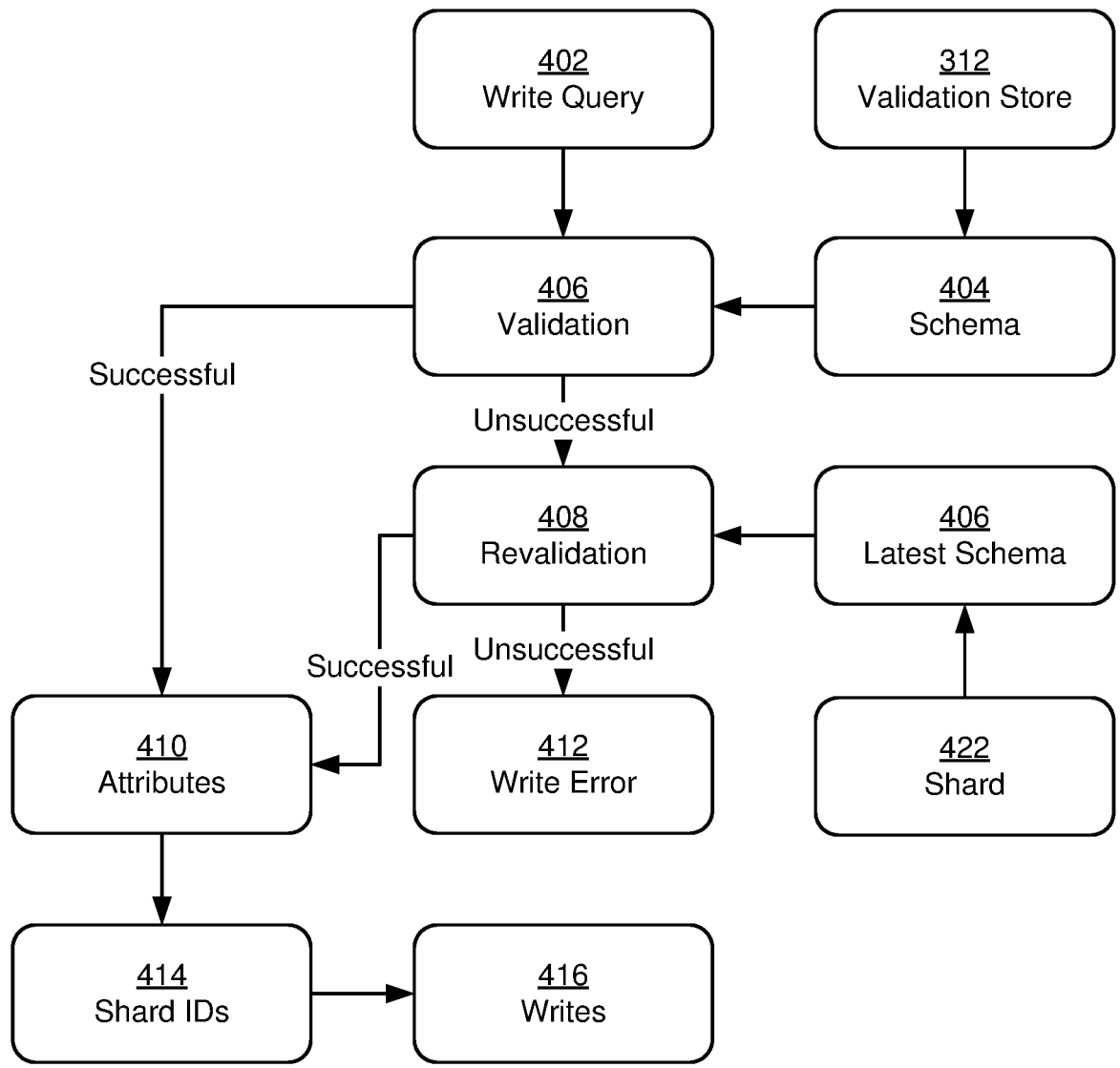
FIG. 4 shows the processing of a write query in a graph database in accordance with the disclosed embodiments.

FIG. 4 shows the processing of a write query 402 in a graph database, such as graph database 200 of FIG. 2, in accordance with the disclosed embodiments. As described above, write query 402 may be received by an instance of a broker, such as broker 302 of FIG. 3. The broker may perform a validation 406 of write query 402 using a schema 404 in validation store 312 on the broker. For example, the broker may verify that predicates in write query 402 are defined and/or that compounds or other complex relationships in write query 402 adhere to rules in schema 404 by attempting to execute write query 402 in a branch of the graph database.

If validation 406 is successful, the broker may transmit write query 402 to all shards in the graph database, and each shard may calculate a set of shard identifiers (IDs) 414 from one or more attributes 410 of write query 402. One or more portions (e.g., edges, compounds, etc.) of write query 402 may then be executed as a set of writes 416 on some or all of the shards based on shard IDs 414. For example, every shard may calculate a hash from every subject and object of an edge to be written using write query 402. If either hash or both hashes match the shard's ID, the shard may write the edge to a log-based representation of the graph database and index for the graph database on the shard's local data store. To process implicit deletes associated with writes of edges containing cardinality-1 predicates, the shard may also generate a hash from an additional object (or subject) in an existing edge with the subject (or object) and a predicate with a cardinality of 1 from a new edge in write query 402. If the hash matches the shard's ID, the shard may delete the existing edge from the shard to maintain consistency in the graph database.

In another example, every shard may calculate shard IDs 414 as a set of hashes from a hub node and all identity-giving nodes in a compound to be written using write query 402. The shard may then write the compound as a tuple to the shard's local data store if any of the hashes matches the shard's ID. The shards may optionally calculate additional shard IDs as hashes from non-identity-giving attributes associated with the compound and write the non-identity-giving attributes to shards identified by the corresponding shard IDs. The non-identity-giving attributes may also, or instead, be included in the tuple that is written to all shards with shard IDs 414 represented by hashes calculated from the hub and identity-giving nodes of the compound. As with the writes of edges containing cardinality-1 predicates, writes of any non-identity-giving nodes with cardinality-1 predicates may be processed as implicit deletes on shards containing existing edges or tuples with the same hub nodes and predicates, as described above.

If validation 406 is unsuccessful, the broker may perform a revalidation 408 of write query 408 using a latest schema 406 for the graph database from a shard 422. For example, the broker may query shard 422 for latest schema 406 and replace schema 404 in validation store 312 with latest schema 406. The broker may then attempt to revalidate write query 408 using latest schema 406 and another branch of the graph database. If revalidation 408 fails, the broker may generate a write error 412 instead of transmitting write query 402 to the shards. If revalidation 408 succeeds, the broker may transmit write query 402 to all shards, and the shards may use attributes 410 of one or more portions (e.g., edges, compounds, etc.) of write query 402 to calculate shard IDs 414 that identify the shards to which writes 416 of the portions are to be made, as discussed above. Finally, the shards represented by shard IDs 414 may execute writes 416 of the corresponding portions of write query 402 in log-based representations and indexes of the graph database in the shards' local data stores.

Figure 5:
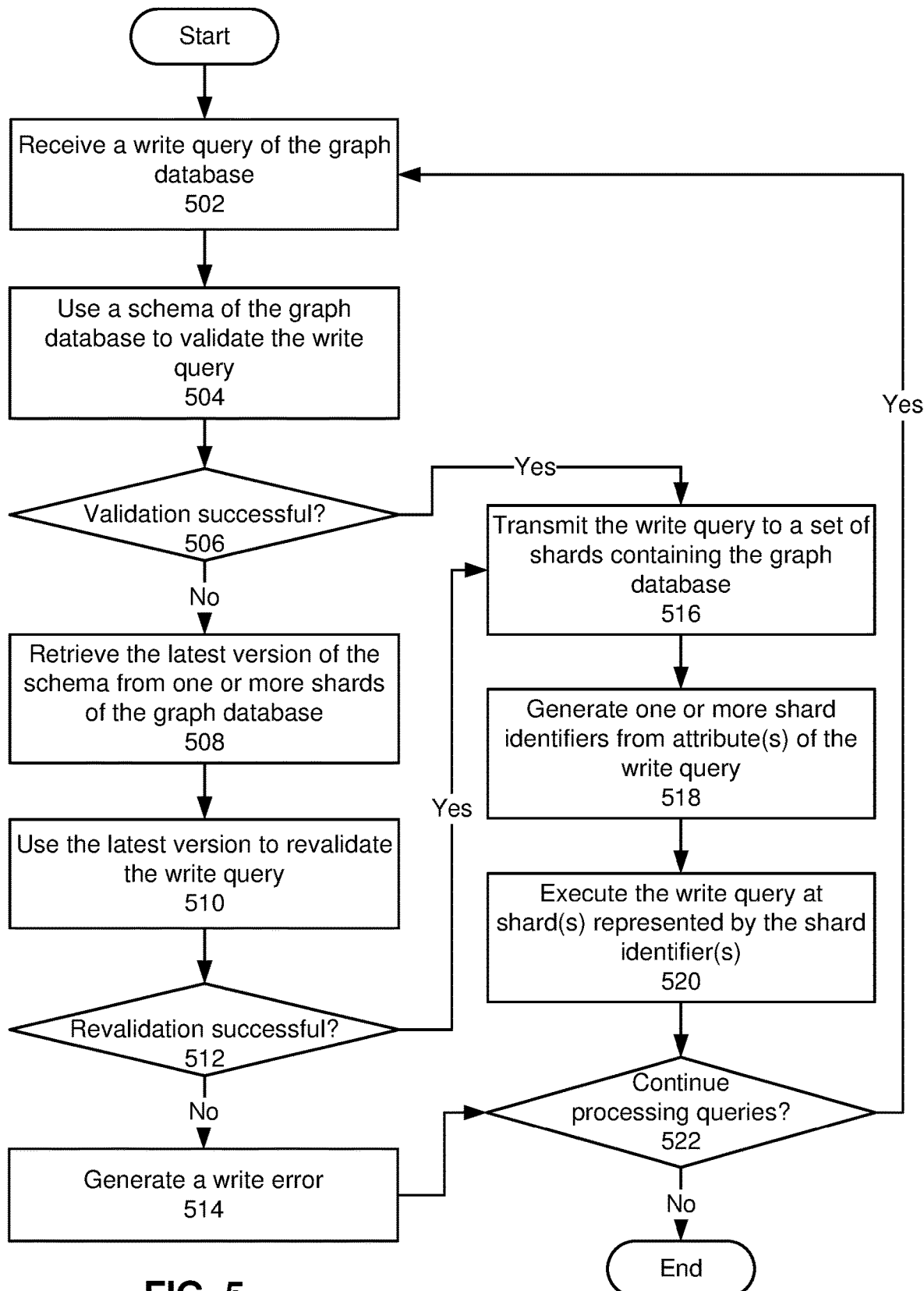
FIG. 5 shows a flowchart illustrating the processing of a distributed graph database write in accordance with the disclosed embodiments.

FIG. 5 shows a flowchart illustrating the processing of a distributed graph database write in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a write query of the graph database is received (operation 502). For example, the write query may be received at one or more instances of a broker, such as broker 302 of FIG. 3. The write query may include one or more edges, compounds, and/or other components or relationships represented in the graph database. Next, a schema of the graph database is used to validate the write query (operation 504). For example, the broker may validate the write query by executing the write query in a branch of the graph database. During execution of the write query, the schema may be used to verify that all predicates in the write query have been defined and/or any compounds or other complex relationships in the write query adhere to the corresponding rules.

The validation may or may not be successful (operation 506). Continuing with the previous example, the validation may succeed if execution of the write query in the graph database branch using the schema succeeds. If the validation does not succeed, the latest version of the schema is retrieved from one or more shards of the graph database (operation 508), and the latest version is used to revalidate the write query (operation 510). For example, the write query may be revalidated by attempting to execute the write query in a different branch of the graph database using the latest version of the schema. The write query may then be processed based on the success or failure of the revalidation (operation 512). If the revalidation is unsuccessful, a write error is generated (operation 514), and the write query is not executed.

If the validation or revalidation of the write query succeeds, the write query is transmitted to a set of shards containing the graph database (operation 516). Each shard then generates one or more shard identifiers from one or more attributes of the write query (operation 518), and the write query is executed at one or more shards represented by the shard identifier(s) (operation 520). For example, the shard may generate the shard identifiers as hashes from the subject and object of an edge in the write query. If the edge contains a cardinality-1 predicate, the shard may also generate a hash from an additional object in an existing edge with the same subject (or object) and predicate on the shard. In another example, the shard may generate shard identifiers as hashes from a hub node, a set of identity-giving nodes, and/or a set of non-identity-giving attributes of a compound in the write query. If a shard identifier generated from one or more attributes in a given portion (e.g., edge, compound, etc.) of the query matches the shard's identifier, the portion may be written to the shard.

Processing of queries may continue (operation 522) during implementation of the graph database using the broker and shards. During processing of the queries, each write query is received at the broker (operation 502) and validated and/or revalidated by the broker (operations 504-512). If both validation and revalidation of the write query fail, a write error is generated (operation 514). If validation or revalidation of the write query succeeds, the write query is executed at one or more shards containing the graph database based on shard identifiers calculated from attributes of the write query (operations 516-520). Such distributed processing of write queries may continue until querying of the graph database is no longer performed using the broker and shards.

Figure 6:
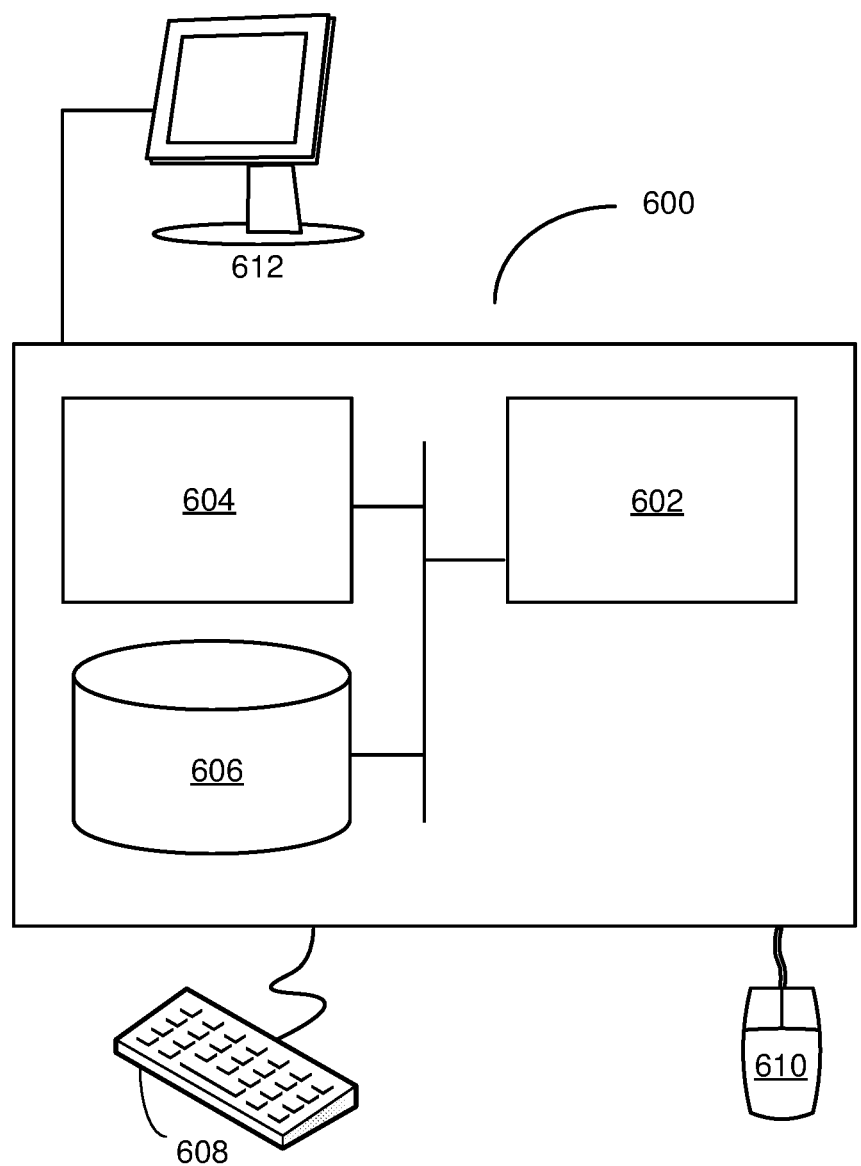
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing queries of a graph database. The system includes a broker and a set of shards, one or more of which may be alternatively be termed or implemented as a module, mechanism, or other type of system component. The broker may use a schema of the graph database to validate the write query and transmit the validated write query to the shards. Each shard may then process the write query at the shard based on one or more attributes in the write query. For example, the shard may generate one or more shard identifiers from the attribute(s) and execute a portion of the write query at the shard when the portion contains an attribute that produces a shard identifier for the shard.

In addition, one or more components of computer system 600 may be remotely located and connected to the other components over a network. Portions of the present embodiments (e.g., broker, shards, graph database, etc.) may also be located on different nodes of a distributed system that implements the embodiments. For example, the present embodiments may be implemented using a cloud computing system that processes queries of a distributed graph database from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
executing a set of processes for processing queries of a graph database storing a graph, wherein the graph comprises a set of nodes, a set of edges between pairs of nodes in the set of nodes, and a set of predicates;
when a write query of the graph database is received, using one or more of the processes to process the write query by:
using a schema of the graph database to validate the write query;
transmitting the validated write query to a set of shards comprising the graph database; and
for each shard in the set of shards, processing the write query at the shard when a shard identifier representing the shard is matched to one or more attributes in the write query;
when an additional write query fails validation using the schema, retrieving a latest version of the schema from one or more of the shards; and
using the latest version of the schema to revalidate the additional write query.

2. The method of claim 1, wherein using the schema to validate the write query comprises:
executing the write query in a branch of the graph database; and
validating the write query when the executed write query succeeds.

3. The method of claim 1, wherein processing the write query at the shard when the shard identifier representing the shard is matched to the one or more attributes in the write query comprises:
generating one or more shard identifiers from the one or more attributes; and
when the one or more shard identifiers includes the shard identifier representing the shard, executing a portion of the write query associated with the shard identifier at the shard.

4. The method of claim 3, wherein the one or more shard identifiers are generated from hashes of the one or more attributes.

5. The method of claim 3, wherein the one or more shard identifiers are generated from a set of identity-giving nodes in a compound from the write query.

6. The method of claim 5, wherein the one or more shard identifiers are further generated from a non-identity-giving attribute associated with the compound.

7. The method of claim 3, wherein the one or more shard identifiers are generated from a subject and an object in an edge from the write query.

8. The method of claim 7, wherein:
the one or more shard identifiers are further generated from an additional object in an existing edge comprising the subject and a predicate from the edge, wherein the predicate has a cardinality of 1; and
wherein processing the portion of the query associated with the shard identifier at the shard comprises deleting the existing edge at the shard.

9. The method of claim 1, wherein the schema is used to validate at least one of:
a predicate; and
a compound.

10. The method of claim 1, wherein each shard in the set of shards comprises:
a log-based representation of the graph database; and
an index of the graph database.

11. The method of claim 1, further comprising:
when the write query includes a new edge with a subject, an object, and a predicate, applying an implicit delete functionality at the shard to delete an existing edge comprising at least the predicate and the subject.

12. An apparatus, comprising:
one or more processors; and
memory storing instructions that, when executed by the one or more processors, cause the apparatus to:
   execute a set of processes for processing queries of a graph database storing a graph, wherein the graph comprises a set of nodes, a set of edges between pairs of nodes in the set of nodes, and a set of predicates;
   when a write query of the graph database is received, use one or more of the processes to process the write query by:
      using a schema of the graph database to validate the write query;
      transmitting the validated write query to a set of shards comprising the graph database; and
      for each shard in the set of shards, processing the write query at the shard when a shard identifier representing the shard matches one or more attributes in the write query;
   retrieve a latest version of the schema from one or more of the shards when an additional write query fails validation using the schema; and
   use the latest version of the schema to revalidate the additional write query.

13. The system of claim 12, wherein the memory further stores instructions that, when executed by the one or more processors, cause the apparatus to:
   when the write query includes a new edge with a subject, an object, and a predicate, apply an implicit delete functionality at the shard to delete an existing edge comprising at least the predicate and the subject.

14. The apparatus of claim 12, wherein using the schema to validate the write query comprises:
   executing the write query in a branch of the graph database; and
   validating the write query when the executed write query succeeds.

15. The apparatus of claim 12, wherein processing the write query at the shard when the shard identifier representing the shard is matched to the one or more attributes in the write query comprises:
   generating one or more shard identifiers from the one or more attributes; and
   when the one or more shard identifiers includes the shard identifier representing the shard, executing a portion of the write query associated with the shard identifier at the shard.

16. The apparatus of claim 15, wherein each portion in the one or more portions comprises at least one of:
   an edge; and
   a compound.

17. The apparatus of claim 15, wherein the one or more shard identifiers are generated from hashes of the one or more attributes.

18. The apparatus of claim 15, wherein the one or more shard identifiers are generated from at least one of:
   a set of identity-giving nodes in a compound from the write query;
   a non-identity-giving attribute associated with the compound;
   a subject and an object in an edge from the write query; and
   an additional object in an existing edge comprising the subject and a predicate from the edge, wherein the predicate has a cardinality of 1.

19. A system, comprising:
   a graph database storing a graph, wherein the graph comprises a set of nodes, a set of edges between pairs of nodes in the set of nodes, and a set of predicates;
   a broker comprising a non-transitory computer-readable medium comprising instructions that, when executed, cause the system to process a query of the graph database by:
      using a schema of the graph database to validate the write query;
      transmitting the validated write query to a set of shards comprising the graph database;
      retrieving a latest version of the schema from one or more of the shards when an additional write query fails validation using the schema; and
      using the latest version of the schema to revalidate the additional write query; and
   the set of shards, wherein each shard in the set of shards comprises a non-transitory computer-readable medium comprising instructions that, when executed, cause the system to process the write query at the shard when a shard identifier representing the shard is matched to one or more attributes in the write query.

20. The system of claim 19, wherein processing the write query at the shard when the shard identifier representing the shard is matched to the one or more attributes in the write query comprises:
   generating one or more shard identifiers from the one or more attributes; and
   when the one or more shard identifiers includes the shard identifier for the shard, executing a portion of the write query associated with the shard identifier at the shard.

* * * * *